(12) United States Patent
Nelson et al.

(10) Patent No.: US 7,233,778 B2
(45) Date of Patent: Jun. 19, 2007

(54) APPARATUS AND METHOD FOR CONVERTING A SIGNAL FROM A FIRST ANALOG FORMAT TO A SECOND ANALOG FORMAT

(75) Inventors: Richard Nelson, Irvine, CA (US); Brian Sprague, Irvine, CA (US); Donald McMullin, Laguna Hills, CA (US); Richard Prodan, Boulder, CO (US); Pieter Vorenkamp, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/854,769

(22) Filed: May 27, 2004

(65) Prior Publication Data

US 2005/0017882 A1    Jan. 27, 2005

Related U.S. Application Data

(63) Continuation of application No. 60/473,190, filed on May 27, 2003.

(51) Int. Cl.
   *H03D 5/00* (2006.01)
(52) U.S. Cl. .................. 455/142; 455/144; 455/434
(58) Field of Classification Search ............ 375/259, 375/222, 262, 267; 455/422, 432, 68, 504, 455/561, 434; 341/110
   See application file for complete search history.

(56) References Cited

U.S. PATENT DOCUMENTS 4,870,370 A    9/1989 Hedberg et al.
5,715,280 A *  2/1998 Sandberg et al. ........... 375/260
5,903,324 A    5/1999 Lyons et al.
5,949,878 A *  9/1999 Burdge et al. .............. 380/276
6,236,731 B1 * 5/2001 Brennan et al. ............ 381/316
6,271,953 B1 * 8/2001 Dishman et al. ............ 398/129

(Continued)

OTHER PUBLICATIONS

Society of Cable Telecommunications Engineers (SCTE 40 2004) "Digital Cable Network Interface Standard".*

(Continued)

*Primary Examiner*—Linh V. Nguyen
(74) *Attorney, Agent, or Firm*—Sterne, Kessler, Goldstein & Fox P.L.L.C.

(57) ABSTRACT

An apparatus for converting a signal from a first analog format to a second analog format. The apparatus has an input port, a first converter, filters, first mixers, second converters, and an output port. The input port is configured to receive the signal. The signal has the first analog format. In an embodiment, the first analog format complies with the SCTE 40 2003 technical standard. In an embodiment, the second analog format is a conventional analog format. The first converter is coupled to the port and is configured to convert the signal to a first digital format. The filters are coupled to the first converter and configured to isolate a first channel of the signal from a second channel of the signal. The first mixers are coupled to the filters and configured to expand the first channel and the second channel to a second digital format. The second converters are coupled to the first mixers and configured to convert the first channel and the second channel to the second analog format. The output port is coupled to the second converters and configured to produce the signal having the second analog format.

44 Claims, 10 Drawing Sheets

U.S. PATENT DOCUMENTS

| | | | |
|---|---|---|---|
| 6,347,121 B1* | 2/2002 | Sointula | 375/259 |
| 6,473,474 B1* | 10/2002 | Wiegand | 375/350 |
| 6,538,656 B1 | 3/2003 | Cheung et al. | |
| 6,549,143 B1 | 4/2003 | O'Donnell et al. | |
| 6,690,748 B2* | 2/2004 | Martin | 375/324 |
| 6,931,241 B2* | 8/2005 | Khlat et al. | 455/137 |
| 2002/0136288 A1* | 9/2002 | McCarty, Jr. | 375/232 |
| 2003/0087634 A1* | 5/2003 | Raghavan et al. | 455/423 |
| 2003/0193923 A1* | 10/2003 | Abdelgany et al. | 370/342 |

OTHER PUBLICATIONS

*Digital Cable Network Interface Standard: SCTE 40 2003 (formerly DVS 313)*, Society of Cable Telecommunications Engineers, pp. i-iv and 1-28 (May 1, 2003).

*Digital Cable Network Interface Standard: ANSI/SCTE 40 2004*, Society of Cable Telecommunications Engineers, pp. i-iv and 1-27 (2004), no month.

*Home Digital Network Interface Specification with Copy Protection:ANSI/SCTE 26 2001 (formerly DVS 194)*, Society of Cable Telecommunications Engineers, pp. i-iv and 1-24 (2001), no month.

*History of Satellite TV Main Page*, 2 pages, at http://www.orbitsat.com/AboutSat/history.htm, (printed Apr. 26, 2004).

*History of Satellite TV Page 1*, 2 pages, at http://www.orbitsat.com/AboutSat/history1.htm, (printed Apr. 26, 2004).

*History of Satellite TV Page 2*, 2 pages, at http://www.orbitsat.com/AboutSat/history2.htm, (printed Apr. 26, 2004).

*History of Satellite TV Page 4*, at http://www.orbitsat.com/AboutSat/history4.htm, 2 pages, (printed Apr. 26, 2004).

*History of Satellite TV Page 5*, 1 page, at http://www.orbitsat.com/AboutSat/history5.htm, (printed Apr. 26, 2004).

Cangellaris, A. et al., *Interactive Tutorial on Fundamentals of Signal Integrity for High-Speed/High-Density Design*, pp. 1-38 (2001), no month.

*CATV Frequencies*, 3 pages, at http://w4zt.com/fregs/catv.html, (last updated Nov. 5, 2002).

*BTSC Stereo Encoding White Paper*, 9 pages, downloaded from http://www.espipd.com/images/ESP%20BTSC%20White%20Paper.pdf, (printed Apr. 16, 2004).

Dhar, S., *DOCSIS Set-Top Gateway: Next Generation Digital Video Out-Of-Band Transport*, 19 pages, downloaded from http://www.cisco.com/application/pdf/en/us/guest/netsol/ns289/c664/ccmigration_09186a008020977e.pdf, (printed Apr. 12, 2004).

*Cable History*, 9 pages, at http://www.cablecenter.org/history/timeline/decade,cfm?start=1970, (Copyright 2002), no month.

*Cable TV Channel Frequencies*, 6 pages, at http://www.ineuhaus.com/fccindex/cabtech.html, (last modified Jan. 28, 2003).

*TV Channel, CATV and FM Broadcast Frequencies*, 12 pages, at http://www.arrl.org/tis/info/catv-ch.html, (last modified Feb. 9, 2004).

*Quality RF Services, Inc. US Broadcast TV Channel Frequencies*, 1 page, at http://www.qrf.com/broadchs.htm, (printed May 26, 2003).

Krauss, J., *Capital Currents: The digital tuner decision*, 2 pages, at http://www.cedmagazine.com/ced/2002/1002/10cc.htm, (Copyright 2003), no month.

*Quadrature Amplitude Modulation*, 2 pages, at http://www.physics.udel.edu/wwwusers/watson/student_projects/scen167/thosguys/qam.htm, (printed May 23, 2003).

*A Beginners Guide for MPEG-2 Standard*, 11 pages, at http://www.fh-friedberg.de/fachbereiche/e2/telekom-labor/zinke/mk/mpeg2beg/beginnzi.htm, (printed May 24, 2003).

*Globetrotter Dongles (FLEXid) Frequently Asked Questions*, 7 pages, at http://www.globetrotter.com/flexlm/dogle_faq.htm, (Copyright 2002-2003), no month.

*Cable Converter Box FAQ*, 6 pages, at http://www.cable-converter-box.com/help.htm, (printed May 23, 2003).

*Short MPEG-2 description*, 7 pages, at http://mpeg.telecomitalialab.com/standards/mpeg-2/mpeg-2.htm, (Oct. 2000).

*Analog Avenue Product Review: Broadcom BCM4201 Universal Satellite Receiver*, 3 pages, at http://www/chipcenter.com/analog/product_archives/prod128.htm, (Copyright 2002), no month.

*Compact, Thin-Profile, Low-Power Design: Sharp Develops a New Receiver Tuner and Decoder Board for Coming U.S. Digital-Broadcast Set-Top Boxes*, 3 pages, at http://sharp-world.com/corporate/news/9807.htm, (Jun. 22, 1998).

*BCM97315 Product Brief: BCM97315 DBS Set-Top Box Reference Design*, 2 pages, Broadcom Corporation, (Copyright 2002), no month.

*BCM7315 Product Brief: Single-Chip Satellite Set-Top Box Decoder*, 2 pages, Broadcom Corporation, (Copyright 2002), no month.

Anfuso, D., *Digital TV is Coming*, 2 pages, at http://www.imediaconnection.com/content/news/033103b.asp, (Mar. 31, 2003).

Quan, M., *Digital TV market to see rapid growth*, 3 pages, at http://www.eetimes.com/sys/news/OEG20030311S0025, (Mar. 11, 2003).

Tarr, G., *FCC Sets Guidelines For Digital Cable TV*, 3 pages, at http://www.twice.com/index.asp?layout=story_stocks&articleid=CA40028, (Sep. 25, 2000).

*FCC Adopts Rules For Labeling Of DTV Receivers*, 2 pages, at http://www.fcc.gov/mb/dtvlab.txt, (Sep. 14, 2000).

Cameron, E., *The Nation's Evolution to Digital Television*, 14 pages (undated).

*FCC Conversion Timeline*, 2 pages, at http://www.idahoptv.org/dtv/idaho/fcc_timeline.htm, (last updated Jul. 31, 2000).

*Digital Broadcast Timeline*, 2 pages, at http://www.pbs.org/opb/crashcourse/hdtv/timeline.html, (Copyright 1998), no month.

*Digital TV Timeline*, 3 pages, at http://www.wired.com/news/culture/0.1284.14770.00.html, (Sep. 9, 1998).

*Frequently Asked Question About Stereo TV*, 3 pages, at http://www.thatcorp.com/tvfaqs.shtml, (Copyright 1997-2003), no month.

*Code of Federal Regulations Title 47, vol. 4, Cite 47CFR73.603: Numerical designation of television channels*, 2 pages, at http://a257.g.akamaitech.net/7/257/2422/05dec20031700/edocket.access.gpo.gov/cfr_2003...*, (Oct. 1, 2003).

*FCC Cable Rules: Code of Federal Regulations: Title 47—Telecommunication: Chapter I—Federal Communications Commission: Subchapter C—Broadcast Radios Services: Part 76—Cable Television Service: §76.605 Technical Standards*, 5 pages. (undated).

*TiVo Selects Broadcom's Advanced Graphics and Video Encoder Chips to Increase DVR Capabilities*, 1 page, at http://www.eesource.com/pub/news/001general/5-07-02-3.html, (May 7, 2002).

*Quality RF Services, Inc. US CATV Channel Frequencies*—p. 1, 1 page, at http://www.grf.com/catvfrg1.htm, (printed May 26, 2003).

*ADB Set-top Box to Launch First US HDTV Broadcast*, 2 pages, at http://www.adbglobal.com/pressroom/_m.html, (Nov. 19, 2001).

\* cited by examiner

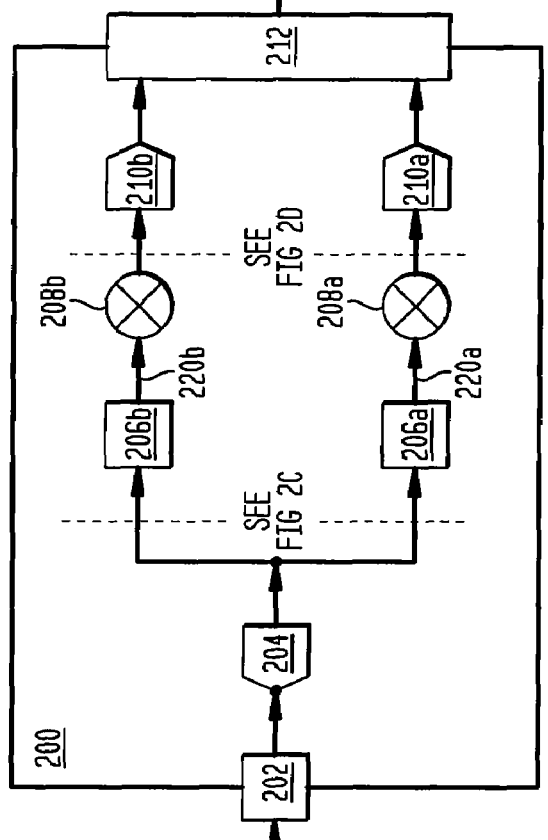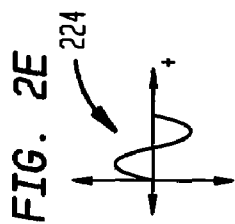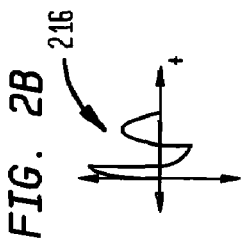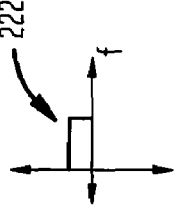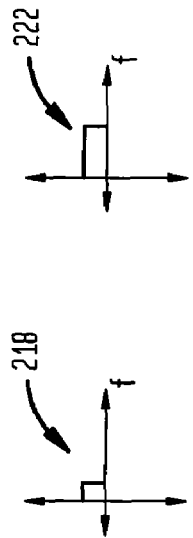

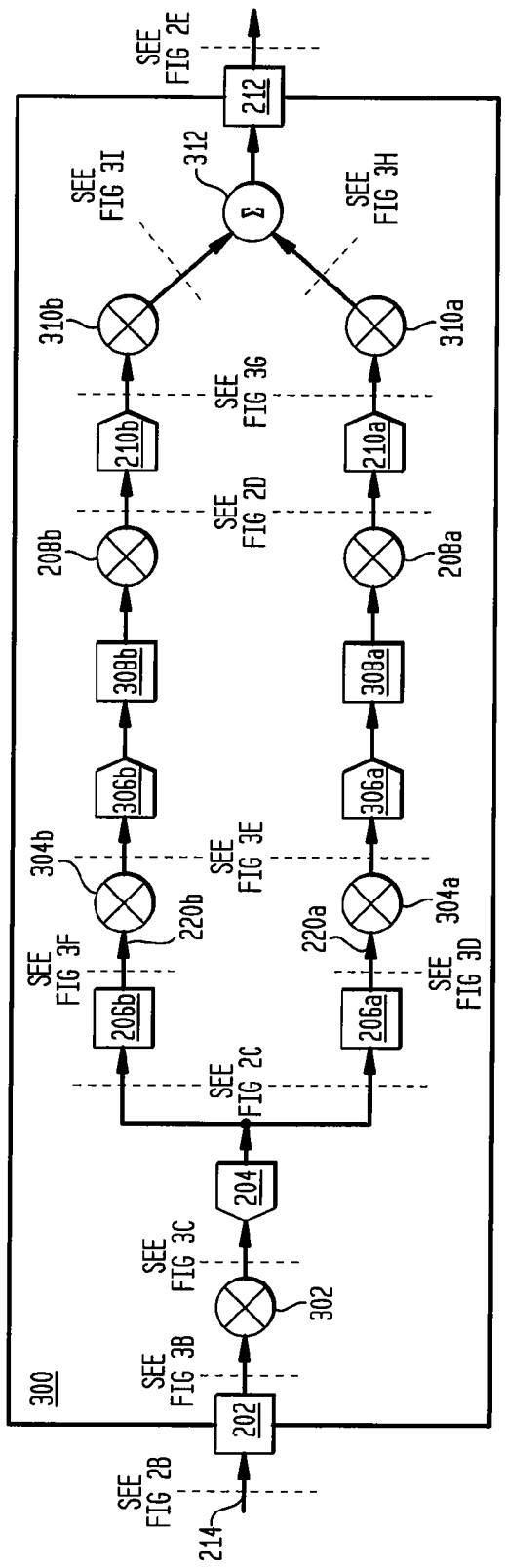

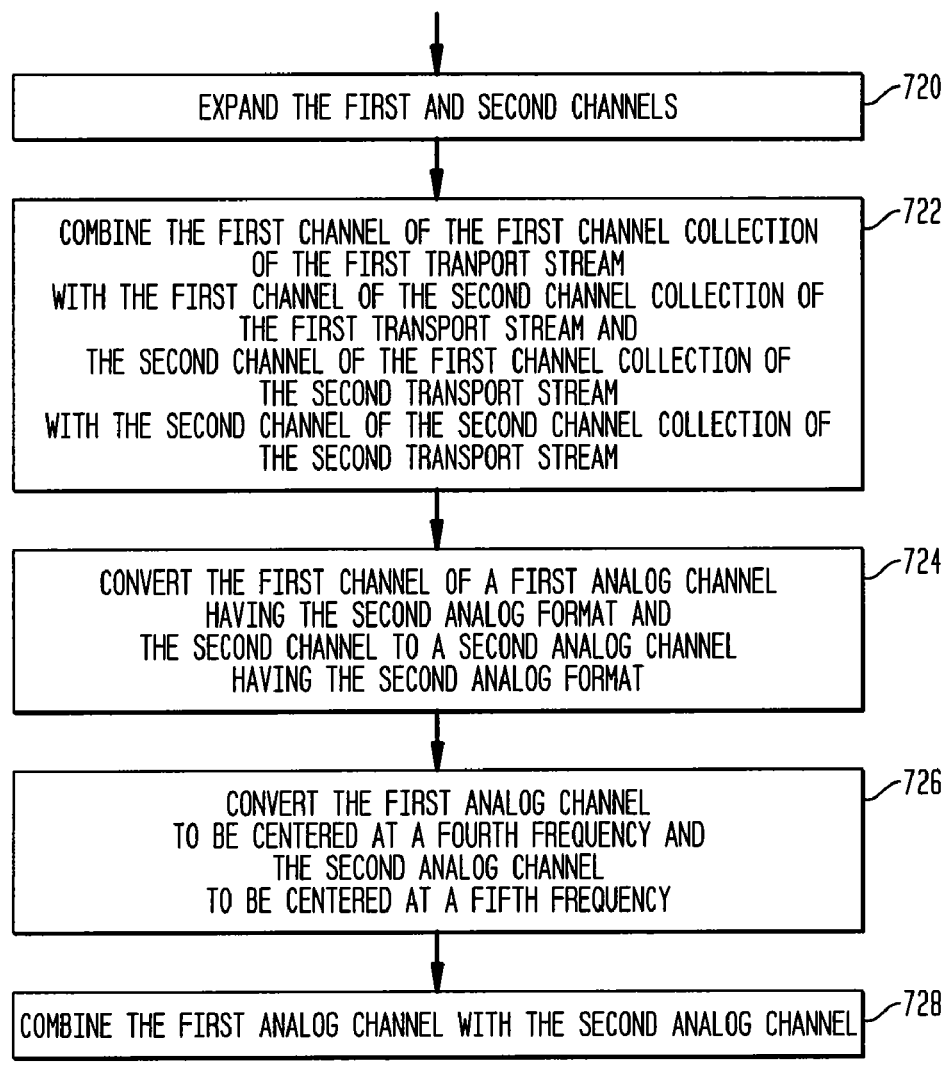

APPARATUS AND METHOD FOR CONVERTING A SIGNAL FROM A FIRST ANALOG FORMAT TO A SECOND ANALOG FORMAT

CROSS-REFERENCE TO RELATED APPLICATIONS

This application claims the benefit of U.S. Provisional Application No. 60/473,190, filed May 27, 2003, which is incorporated herein in its entirety by reference.

BACKGROUND OF THE INVENTION

1. Field of the Invention

The present invention relates to television systems.

2. Background Art

Improvements in television (TV) technologies over the past half century have facilitated the development of different systems for providing TV signals.

In addition to broadcast TV systems, such systems include community antenna TV (CATV) systems (i.e., cable TV) and direct-to-home (DTH) TV systems (i.e., satellite TV). Providers of broadcast and DTH TV signals must contend with the locations and the widths of the bands of frequencies in the electromagnetic spectrum that have been allocated to them by the United States Federal Communications Commission (FCC). Providers of CATV signals, which typically are conveyed via transmission lines, such as coaxial cables, can be limited by the lowpass filter characteristics of the transmission lines. For these reasons, the different systems generally operate over different bands of frequencies.

Advancements in TV technologies have also facilitated the development of additional services that can be rendered via TV systems. Such services include, but are not limited to, more channels for TV programs, video on demand, and Internet communications. However, the ability to provide simultaneously several of these services to a user can be constrained by the widths of the bands of frequencies that are available for (e.g., assigned by the FCC) or capable of (e.g., the lowpass filter characteristics of transmission lines) providing TV signals. Because of these frequency constraints, expanding the number of services that TV systems can simultaneously provide depends upon an ability to increase the amount of data that can be transmitted within the given bands of frequencies. Thus, there is a need to increase the amount of data that can be transmitted within the given bands of frequencies.

BRIEF SUMMARY OF THE INVENTION

The present invention relates to television (TV) systems. In an embodiment, the present invention comprises an apparatus for converting a signal from a first analog format to a second analog format. The apparatus has an input port, a first converter, filters, first mixers, second converters, and an output port. The input port is configured to receive the signal. The signal has the first analog format. In an embodiment, the first analog format complies with the Society of Cable Telecommunications Engineers (SCTE) technical standard SCTE 40 2003 "Digital Cable Network Interface Standard". In an embodiment, the second analog format is a conventional analog format. The first converter is coupled to the port and configured to convert the signal to a first digital format. The filters are coupled to the first converter and configured to isolate a first channel of the signal from a second channel of the signal. The first mixers are coupled to the filters and configured to expand the first channel and the second channel to a second digital format. The second converters are coupled to the first mixers and configured to convert the first channel and the second channel to the second analog format. The output port is coupled to the second converters and configured to produce the signal having the second analog format.

Optionally, the apparatus can further comprise a second mixer coupled to the input port and configured to convert the signal from being centered at a first frequency to being centered at a second frequency.

Optionally, the apparatus can further comprise second mixers coupled to the filters and configured to convert the first channel from being centered at a first frequency to being centered at a second frequency and the second channel from being centered at a third frequency to being centered at the second frequency.

Optionally, the apparatus can further comprise demodulators coupled to the filters and configured to demodulate the first channel and the second channel.

Optionally, the apparatus can further comprise encoders coupled to the first mixers and configured to encode the first channel and the second channel.

Optionally, the apparatus can further comprise second mixers coupled to the second converters and configured to convert the first channel from being centered at a first frequency to being centered at a second frequency and the second channel from being centered at the first frequency to being centered at a third frequency. The apparatus can further comprise a combiner coupled to the second mixers and configured to combine the first channel with the second channel.

If the first channel is a first channel collection and the second channel is a second channel collection, then the apparatus optionally can further comprise a multiplexer, a demultiplexer, a first combiner, and a second combiner. The multiplexer is coupled to the filters and configured to multiplex a first channel of the first channel collection with a first channel of the second channel collection to a first transport stream and to multiplex a second channel of the first channel collection with a second channel of the second channel collection to a second transport stream. The demultiplexer is coupled to the multiplexer and configured to demultiplex the first transport stream to the first channel of the first channel collection and the first channel of the second channel collection and to demultiplex the second transport stream to the second channel of the first channel collection and the second channel of the second channel collection. The first combiner is coupled to the demultiplexer and configured to combine the first channel of the first channel collection with the first channel of the second channel collection. The second combiner is coupled to the demultiplexer and configured to combine the second channel of the first channel collection with the second channel of the second channel collection.

In another embodiment, the present invention comprises an apparatus for converting signals. The apparatus has an input port, a first filter, a mixer, a second filter, a decompressor, and an output port. The input port is configured to receive the signals. The first filter is coupled to the input port and configured to pass a digital signal of the signals. The digital signal is centered at a first frequency. The mixer is coupled to the first filter and configured to convert the digital signal from being centered at the first frequency to being centered at a second frequency. The second filter is coupled to the input port and configured to pass an analog signal of the signals. The analog signal is centered at a third frequency. The decompressor is coupled to the second filter and configured to decompress the analog signal. The output port is coupled to the mixer and the decompressor and configured to produce the digital signal and the analog signal. In an embodiment, the digital signal and the analog signal are configured to comply with the SCTE 40 2003 technical standard when received at the input port.

In yet another embodiment, the present comprises a method for converting a signal from a first analog format to a second analog format. The signal is received. The signal has the first analog format. The signal is centered at a first frequency. The signal having the first analog format can be a digital representation of the signal such that the digital representation is realized with a continuously varying waveform. The continuously varying waveform can be quadrature amplitude modulated. The first analog format can be a compressed format and the second analog format can be a decompressed format. In an embodiment, the first analog format complies with the SCTE 40 2003 technical standard. In an embodiment, the second analog format is a conventional analog format.

Optionally, the signal is converted to be centered at a second frequency. The signal is converted to a digital format. The signal has a plurality of channels. Each channel of the plurality of channels is centered at a corresponding frequency. Optionally, a first channel of the plurality of channels is isolated from a second channel of the plurality of channels. The first channel is centered at a first corresponding frequency. The second channel is centered at a second corresponding frequency. Optionally, the first channel is converted to be centered at a third frequency and the second channel is converted to be centered at the third frequency. Optionally, the signal is demodulated.

If the first channel is a first channel collection and the second channel is a second channel collection, then optionally: (1) a first channel of the first channel collection is multiplexed with a first channel of the second channel collection to a first transport stream and a second channel of the first channel collection is multiplexed with a second channel of the second channel collection to a second transport stream; and (2) the first channel of the first channel collection of the first transport stream is demultiplexed, the first channel of the second channel collection of the first transport stream is demultiplexed, the second channel of the first channel collection of the second transport stream is demultiplexed, and the second channel of the second channel collection of the second transport stream is demultiplexed.

Optionally, the signal is encoded. The signal is expanded. The first channel can be expanded and the second channel can be expanded.

If the first channel is a first channel collection and the second channel is a second channel collection, then optionally the first channel of the first channel collection of the first transport stream is combined with the first channel of the second channel collection of the first transport stream and the second channel of the first channel collection of the second transport stream is combined with the second channel of the second channel collection of the second transport stream.

The signal is converted to the second analog format. The first channel can be converted to a first analog channel and the second channel can be converted to a second analog channel. The first analog channel has the first analog format and the second analog channel has the second analog format. Optionally, the signal can be converted to be centered at a fourth frequency. The first analog channel can be converted to be centered at a fifth frequency and the second analog channel can be converted to be centered at a sixth frequency. Optionally, the first analog channel is combined with the second analog channel.

In still another embodiment, the present comprises a method for converting signals. An analog signal of the signals is received. The analog signal has a compressed format. The analog signal having the compressed format can be a digital representation of the signal such that the digital representation is realized with a continuously varying waveform. The continuously varying waveform can be quadrature amplitude modulated. A digital signal of the signals is received. The digital signal is centered at a first frequency. The digital signal is converted to be centered at a second frequency. The analog signal is decompressed. In an embodiment, the analog signal having the compressed format and the digital signal centered at the first frequency comply with the SCTE 40 2003 technical standard.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

FIG. 2A is a block diagram of an embodiment of an apparatus 200 of the present invention.

FIGS. 2B and 2E are graphs of first analog format 216 and second analog format 224.

FIGS. 2C and 2D are graphs of signal 214 as a function of frequency.

FIG. 3A is a block diagram of an embodiment of an apparatus 300 of the present invention.

FIGS. 3B and 3C are graphs of signal 214 as a function of frequency.

FIGS. 3D–3I are graphs of first channel 220a and second channel 220b as functions of frequency.

FIGS. 7A and 7B show a flow chart of a method 700 for converting a signal from a first analog format to a second analog format in the manner of the present invention.

The preferred embodiments of the invention are described with reference to the figures where like reference numbers indicate identical or functionally similar elements. Also in the figures, the left most digit of each reference number identifies the figure in which the reference number is first used.

DETAILED DESCRIPTION OF THE INVENTION

The present invention relates to television (TV) systems. The United States Federal Communications Commission (FCC), in 47 C.F.R. § 73.603, which is incorporated herein in its entirety by reference, allocates 6 MHz of bandwidth for each broadcast TV channel. A bandwidth of 6 MHz was selected to support TV signals having a conventional analog format. Typically, within a broadcast TV channel, a TV signal includes a video signal and an audio signal, each of which has its own carrier frequency. For example, the National Television System Committee (NTSC) has established a technical standard for a broadcast TV channel in which the carrier frequency for the video signal is 1.75 MHz less than the central frequency of the TV channel and the carrier frequency for the audio signal is 2.75 MHz greater than the central frequency of the TV channel.

Because a broadcast TV channel is frequently transmitted by a community antenna TV (CATV) system or a direct-to-home (DTH) TV system, these systems also have channels with bandwidths of 6 MHz. The ability to provide simultaneously several services to a user via a TV system can be constrained by the widths of the bands of frequencies that are available for (e.g., assigned by the FCC) or capable of (e.g., the lowpass filter characteristics of transmission lines) providing TV signals.

For example, state of the art CATV systems can support signal transmission at frequencies up to about 860 MHz. More typical CATV systems can support signal transmission at frequencies up to about 550 MHz. In order to increase the amount of data that can be transmitted within this range of frequencies, CATV signal providers have pursued a transition to digital formatted TV signals. A digital formatted TV signal consumes less bandwidth than a conventional analog formatted TV channel. Also, digital formatted TV channels can be multiplexed together for transmission. Unfortunately, digital TV receivers continue to cost significantly more than their analog counterparts.

Therefore, the rate of transition to digital TV receivers has lagged the rate of transition to digital formatted TV signals. Thus, the need to continue transmitting analog formatted TV signals is expected to continue for the foreseeable future.

Figure 1:
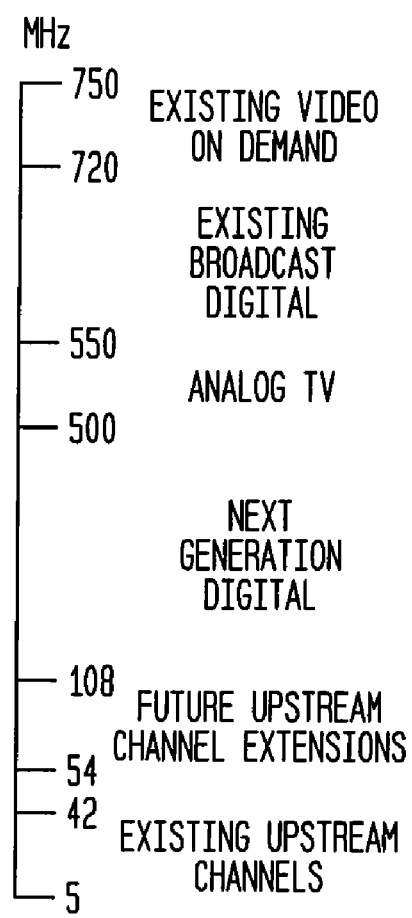
FIG. 1 shows the allocation of services to frequencies according to the SCTE 40 2003 technical standard.

In response to this situation, the Society of Cable Telecommunications Engineers (SCTE) has established technical standard SCTE 40 2003 "Digital Cable Network Interface Standard", which is incorporated herein in its entirety by reference. The SCTE 40 2003 technical standard provides a scheme for compressing conventional analog formatted TV signals via quadrature amplitude modulation (QAM). A QAM channel can have a bandwidth, for example, of about 600 kHz. This allows ten QAM channels to be multiplexed together to form a channel collection. The channel collection can be centered at a given frequency with a bandwidth of about 6 MHz. FIG. 1 shows the allocation of services to frequencies according to the SCTE 40 2003 technical standard. In the SCTE 40 2003 technical standard, analog formatted TV signals are compressed via QAM and transmitted in the band of frequencies between about 500 MHz and about 550 MHz.

The present invention is directed towards an apparatus and a method for converting a signal from a first (e.g., QAM) analog format to a second (e.g., conventional) analog format. In a particular application, the apparatus or method of the present invention receives an analog formatted TV signal with multiple channels compressed via QAM (e.g., from a CATV signal provider) and produces a conventional analog formatted TV signal (e.g., for presentation on an analog TV receiver).

FIG. 2A is a block diagram of an embodiment of an apparatus 200 of the present invention. Apparatus 200 comprises an input port 202; a first converter 204; filters 206a and 206b; first mixers 208a and 208b; second converters 210a and 210b; and an output port 212. Input port 202 is configured to receive a signal 214. Signal 214 has a first analog format 216 (FIG. 2B). First analog format 216 can be, for example, a QAM format. In an embodiment, first analog format 216 complies with the SCTE 40 2003 technical standard. First converter 204 is coupled to input port 202. First converter 204 is configured to convert signal 214 to a first digital format 218. Filters 206a and 206b are coupled to first converter 204. Filters 206a and 206b are configured to isolate a first channel 220a of signal 214 from a second channel 220b of signal 214. First mixers 208a and 208b are coupled to filters 206a and 206b; first mixer 208a is configured to expand first channel 220a (FIG. 2C) to a second digital format 222 (FIG. 2D). First mixer 208b is configured to expand second channel 220b (FIG. 2C) to second digital format 222 (FIG. 2D). Second converters 210a and 210b are coupled to first mixers 208a and 208b. Second converter 210a is configured to convert first channel 220a to a second analog format 224 (FIG. 2E); second converter 210b is configured to convert second channel 220b to second analog format 224 (FIG. 2E). Second analog format 224 can be, for example, a conventional analog format. Output port 212 is coupled to second converters 210a and 210b. Output port 212 is configured to produce signal 214. Signal 214 produced at output port 212 is an uncompressed (or expanded) version of signal 214 received at input port 202. In a particular application, signal 214 produced at output port 212 is compatible for presentation on an analog TV receiver.

FIG. 3A is a block diagram of an embodiment of an apparatus 300 of the present invention. Apparatus 300 comprises input port 202; first converter 204; filters 206a and 206b; first mixers 208a and 208b; second converters 210a and 210b; and output port 212. Apparatus 300 can further comprise any of a second mixer 302; third mixers 304a and 304b; demodulators 306a and 306b; encoders 308a and 308b; fourth mixers 310a and 310b; and a first combiner 312. Described below is an embodiment of apparatus 300 that comprises all of these elements. However, the skilled artisan recognizes alternative embodiments that incorporate some, but not all, of these elements. Accordingly, the present invention is not limited to the configuration of apparatus 300 as depicted at FIG. 3A.

Input port 202 is configured to receive signal 214. Signal 214 has first analog format 216. In an embodiment, first analog format 216 complies with the SCTE 40 2003 technical standard. Second mixer 302 is coupled to input port 202. Second mixer 302 is configured to convert signal 214 from being centered at a first frequency 314 (FIG. 3B) to being centered at a second frequency 316 (FIG. 3C). For example, first frequency 314 can be a radio frequency and second frequency 316 can be a baseband frequency to facilitate analog-to-digital conversion. First converter 204 is coupled to second mixer 302. First converter 204 is configured to convert signal 214 to first digital format 218. Filters 206a and 206b are coupled to first converter 204. Filters 206a and 206b are configured to isolate first channel 220a of signal 214 from second channel 220b of signal 214. Third mixers 304a and 304b are coupled to filters 206a and 206b. Third mixer 304a is configured to convert first channel 220a from being centered at a third frequency 318 (FIG. 3D) to being centered at a fourth frequency 320 (FIG. 3E); third mixer 304b is configured to convert second channel 220b from being centered at a fifth frequency 322 (FIG. 3F) to being centered at fourth frequency 320 (FIG. 3E).

The channel isolation function of filters 206a and 206b can be performed before or after the format conversion function of first converter 204. Also, the optional frequency conversion function of second mixer 302 can be performed before or after the format conversion function of first converter 204. Likewise, the optional frequency conversion functions of third mixers 304a and 304b can be performed before or after the channel isolation function of filters 206a and 206b. If the order of the channel isolation function, the format conversion function, and the frequency conversion functions are changed from the order as depicted at FIG. 3A, then: (1) the optional frequency conversion function of second mixer 302 can be divided among a plurality of mixers; and (2) the optional frequency conversion functions of third mixers 304a and 304b can be combined into a single mixer. Accordingly, the present invention is not limited to the configuration of apparatus 300 as depicted at FIG. 3A.

Demodulators 306a and 306b are coupled to third mixers 304a and 304b. Demodulator 306a is configured to demodulate first channel 220a; demodulator 306b is configured to demodulate second channel 220b. In an embodiment, such demodulation is quadrature amplitude demodulation. The skilled artisan is familiar with implementing quadrature amplitude demodulation. Encoders 308a and 308b are coupled to demodulators 306a and 306b. Encoder 308a is configured to encode first channel 220a; encoder 308b is configured to encode second channel 220b.

First mixers 208a and 208b are coupled to encoders 308a and 308b. First mixer 208a is configured to expand first channel 220a to second digital format 222; first mixer 208b is configured to expand second channel 220b to second digital format 222. Second converters 210a and 210b are coupled to first mixers 208a and 208b. Second converter 210a is configured to convert first channel 220a to second analog format 224; second converter 210b is configured to convert second channel 220b to second analog format 224. Fourth mixers 310a and 310b are coupled to second converters 210a and 210b. Fourth mixer 310a is configured to convert first channel 220a from being centered at a sixth frequency 324 (FIG. 3G) to being centered at a seventh frequency 326 (FIG. 3H); fourth mixer 310b is configured to convert second channel 220b from being centered at sixth frequency 324 (FIG. 3G) to being centered at an eighth frequency 328 (FIG. 3I). For example, sixth frequency 324 can be a baseband frequency and seventh frequency 326 and eighth frequency 328 can be radio frequencies. First combiner 312 is coupled to fourth mixers 310a and 310b. First combiner 312 is configured to combine first channel 220a with second channel 220b. Output port 212 is coupled to first combiner 312. Output port 212 is configured to produce signal 214.

The channel expansion functions of first mixers 208a and 208b can be performed before or after the format conversion functions of second converters 210a and 210b. Also, the optional frequency conversion functions of fourth mixers 310a and 310b can be performed before or after the format conversion function of second converters 210a and 210b. Likewise, the optional frequency conversion functions of fourth mixers 310a and 310b can be performed before or after the channel expansion functions of first mixers 208a and 208b. If the combined functions of the optional frequency conversion functions of fourth mixers 310a and 310b and the combination function of first combiner 312 are performed: (1) before the format conversion functions of second converters 210a and 210b, then the format conversion functions of second converters 210a and 210b can be combined into a single converter; and (2) before the channel expansion functions of first mixers 208a and 208b, then the channel expansion functions of first mixers 208a and 208b can be combined into a single mixer and the format conversion functions of second converters 210a and 210b can be combined into a single converter. Accordingly, the present invention is not limited to the configuration of apparatus 300 as depicted at FIG. 3A.

In a particular application, the apparatus of the present invention receives an analog formatted signal with multiple channels compressed via QAM and produces a conventional analog formatted signal. A QAM channel can have a smaller bandwidth than a conventional channel. This allows QAM channels to be multiplexed together to form a channel collection.

Figure 4A:
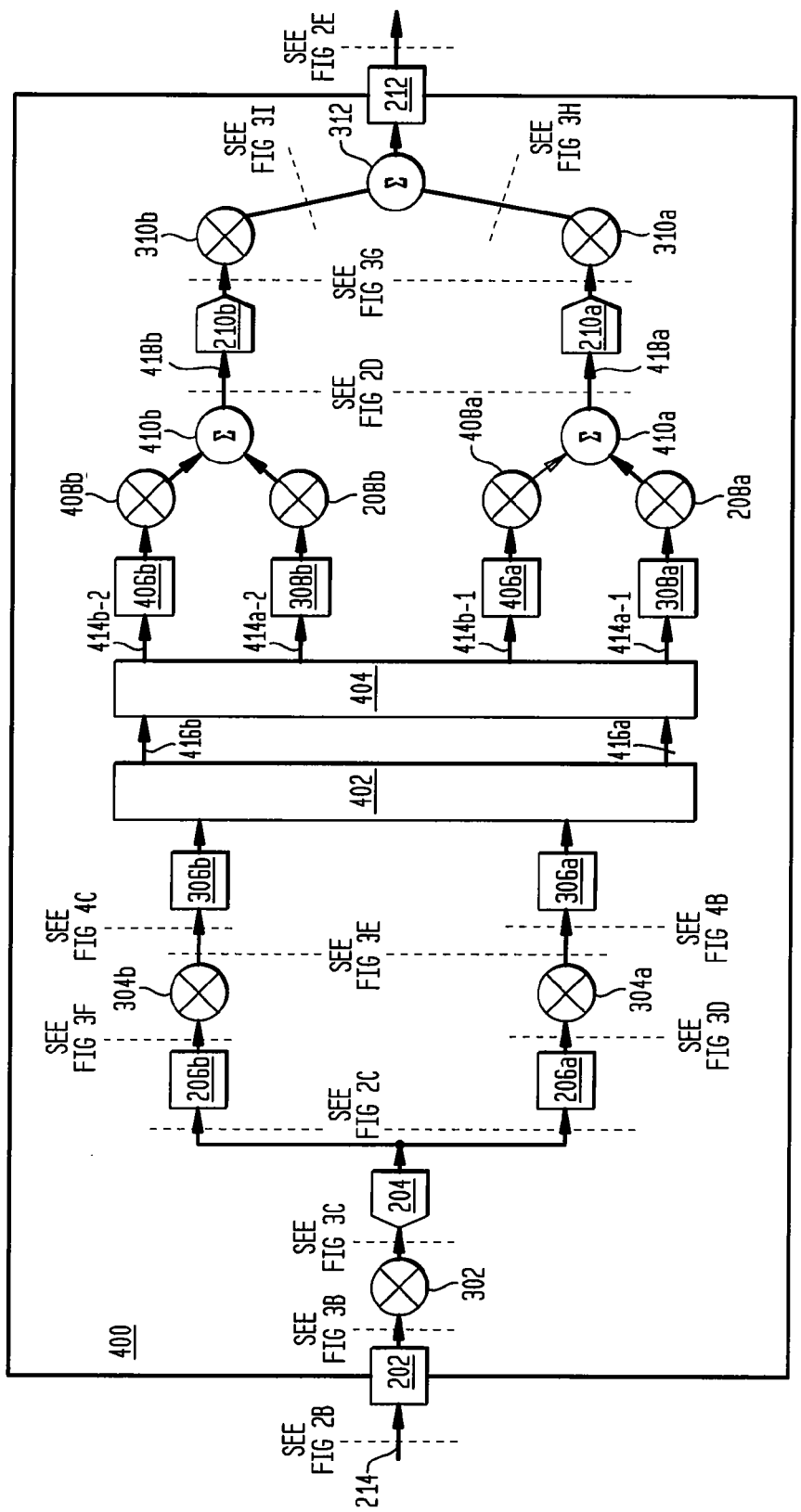
FIG. 4A is a block diagram of an embodiment of an apparatus 400 of the present invention.

FIG. 4A is a block diagram of an embodiment of an apparatus 400 of the present invention. Apparatus 400 comprises input port 202; first converter 204; filters 206a and 206b; first mixers 208a and 208b; second converters 210a and 210b; and output port 212. Apparatus 400 can further comprise any of second mixer 302; third mixers 304a and 304b; demodulators 306a and 306b; a multiplexer 402; a demultiplexer 404; encoders 308a and 308b; encoders 406a and 406b; first mixers 408a and 408b; second combiners 410a and 410b; fourth mixers 310a and 310b; and first combiner 312. Each of first mixers 208a, 208b, 408a, and 408b can be configured in an identical manner. Each of encoders 308a, 308b, 406a, and 406b can be configured in an identical manner. Described below is an embodiment of apparatus 400 that comprises all of these elements. However, the skilled artisan recognizes alternative embodiments that incorporate some, but not all, of these elements. Accordingly, the present invention is not limited to the configuration of apparatus 400 as depicted at FIG. 4A.

Figure 4B:
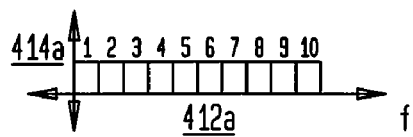
FIGS. 4B and 4C are graphs of first channel collection 412a and second channel collection 412b as functions of frequency.
Figure 4C:
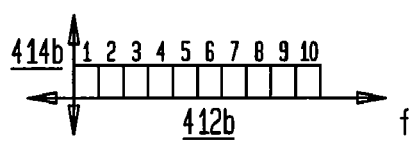

Input port 202 is configured to receive signal 214. Signal 214 has first analog format 216. In an embodiment, first analog format 216 complies with the SCTE 40 2003 technical standard. Second mixer 302 is coupled to input port 202. Second mixer 302 is configured to convert signal 214 from being centered at first frequency 314 to being centered at second frequency 316. For example, first frequency 314 can be a radio frequency and second frequency 316 can be a baseband frequency to facilitate analog-to-digital conversion. First converter 204 is coupled to second mixer 302. First converter 204 is configured to convert signal 214 to first digital format 218. Filters 206a and 206b are coupled to first converter 204. Filters 206a and 206b are configured to isolate a first channel collection 412a (FIG. 4B) of signal 214 from a second channel collection 412b (FIG. 4C) of signal 214. Third mixers 304a and 304b are coupled to filters 206a and 206b. Third mixer 304a is configured to convert first channel collection 412a from being centered at third frequency 318 to being centered at fourth frequency 320; third mixer 304b is configured to convert second channel collection 412b from being centered at a fifth frequency 322 to being centered at fourth frequency 320. Such conversion can be done, for example, to facilitate digital signal processing.

The channel collection isolation function of filters 206a and 206b can be performed before or after the format conversion function of first converter 204. Also, the optional frequency conversion function of second mixer 302 can be performed before or after the format conversion function of first converter 204. Likewise, the optional frequency conversion functions of third mixers 304a and 304b can be performed before or after the channel collection isolation function of filters 206a and 206b. If the order of the channel collection isolation function, the format conversion function, and the frequency conversion functions are changed from the order as depicted at FIG. 4A, then: (1) the optional frequency conversion function of second mixer 302 can be divided among a plurality of mixers and (2) the optional frequency conversion functions of third mixers 304a and 304b can be combined into a single mixer. Accordingly, the present invention is not limited to the configuration of apparatus 400 as depicted at FIG. 4A.

Demodulators 306a and 306b are coupled to third mixers 304a and 304b. Demodulator 306a is configured to demodulate first channel collection 412a; demodulator 306b is configured to demodulate second channel collection 412b. In an embodiment, such demodulation is quadrature amplitude demodulation. The skilled artisan is familiar with implementing quadrature amplitude demodulation.

Multiplexer 402 is coupled to demodulators 306a and 306b. Multiplexer 402 is configured to multiplex a first channel 414a-1 of first channel collection 412a with a first channel 414b-1 of second channel collection 412b to a first transport stream 416a; and to multiplex a second channel 414a-2 of first channel collection 412a with a second channel 414b-2 of second channel collection 412b to a second transport stream 416b. In an embodiment, the transport streams comply with a Moving Pictures Expert Group standard. Demultiplexer 404 is coupled to multiplexer 402. Demultiplexer 404 is configured to demultiplex first transport stream 416a to first channel 414a-1 of first channel collection 412a and first channel 414b-1 of second channel collection 412b; and to demultiplex second transport stream 416b to second channel 414a-2 of first channel collection 412a and second channel 414b-2 of second channel collection 412b. The functions of multiplexer 402 and demultiplexer 404 can be combined into a single cross link switch device.

Encoders 308a, 308b, 406a, and 406b are coupled to demultiplexer 404. Encoder 308a is configured to encode first channel 414a-1 of first channel collection 412a; encoder 406a is configured to encode first channel 414b-1 of second channel collection 412b; encoder 308b is configured to encode second channel 414a-2 of first channel collection 412a; encoder 406b is configured to encode second channel 414b-2 of second channel collection 412b.

First mixers 208a, 208b, 408a, and 408b are coupled to encoders 308a, 308b, 406a, and 406b. First mixer 208a is configured to expand first channel 414a-1 of first channel collection 412a to second digital format 222; first mixer 408a is configured to expand first channel 414b-1 of second channel collection 412b to second digital format 222; first mixer 208b is configured to expand second channel 414a-2 of first channel collection 412a to second digital format 222; first mixer 408b is configured to expand second channel 414b-2 of second channel collection 412b to second digital format 222. Second combiner 410a is coupled to first mixers 208a and 408a. Second combiner 410a is configured to combine first channel 414a-1 of first channel collection 412a with first channel 414b-1 of second channel collection 412b to produce a third channel collection 418a. Second combiner 410b is coupled to first mixers 208b and 408b. Second combiner 410b is configured to combine second channel 414a-2 of first channel collection 412a with second channel 414b-2 of second channel collection 412b to produce a fourth channel collection 418b.

Second converters 210a and 210b are coupled to second combiners 410a and 410b. Second converter 210a is configured to convert third channel collection 418a to second analog format 224; second converter 210b is configured to convert fourth channel collection 418b to second analog format 224. Fourth mixers 310a and 310b are coupled to second converters 210a and 210b. Fourth mixer 310a is configured to convert third channel collection 418a from being centered at sixth frequency 324 to being centered at seventh frequency 326; fourth mixer 310b is configured to convert fourth channel collection 418b from being centered at sixth frequency 324 to being centered at eighth frequency 328. For example, sixth frequency 324 can be a baseband frequency and seventh frequency 326 and eighth frequency 328 can be radio frequencies. First combiner 312 is coupled to fourth mixers 310a and 310b. First combiner 312 is configured to combine third channel collection 418a with fourth channel collection 418b. Output port 212 is coupled to first combiner 312. Output port 212 is configured to produce signal 214.

The channel expansion functions of first mixers 208a, 208b, 408a, and 408b can be performed before or after the format conversion functions of second converters 210a and 210b. Also, the optional frequency conversion functions of fourth mixers 310a and 310b can be performed before or after the format conversion function of second converters 210a and 210b. Likewise, the optional frequency conversion functions of fourth mixers 310a and 310b can be performed before or after the channel expansion functions of first mixers 208a, 208b, 408a, and 408b. If the combined functions of the optional frequency conversion functions of fourth mixers 310a and 310b and the combination function of first combiner 312 are performed before the format conversion functions of second converters 210a and 210b, then the format conversion functions of second converters 210a and 210b can be combined into a single converter. Furthermore, if apparatus 400 included a fourth mixer for each channel and the combined functions of the optional frequency conversion functions of these fourth mixers and the combination function of first combiner 312 are performed before the channel expansion functions of first mixers 208a, 208b, 408a, and 408b, then the channel expansion functions of first mixers 208a, 208b, 408a, and 408b can be combined into a single mixer and the format conversion functions of second converters 210a and 210b can be combined into a single converter. Conversely, if apparatus 400 does not include second combiners 410a and 410b, then each channel would include a corresponding second converter and optionally a corresponding fourth mixer. Accordingly, the present invention is not limited to the configuration of apparatus 400 as depicted at FIG. 4A.

In a particular application, the apparatus of the present invention receives an analog formatted TV signal with multiple channels compressed via QAM (e.g., from a CATV signal provider) and produces a conventional analog formatted TV signal (e.g., for presentation on an analog TV receiver). A QAM channel can have a bandwidth, for example, of about 600 kHz. This allows ten QAM channels to be multiplexed together to form a channel collection. The channel collection can be centered at a given frequency with a bandwidth of about 6 MHz. In the SCTE 40 2003 technical standard, analog formatted TV signals are compressed via QAM and transmitted in the band of frequencies between about 500 MHz and about 550 MHz.

Figure 5B:
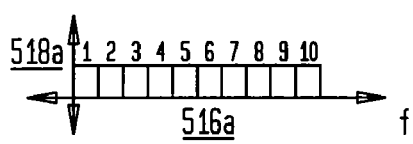
FIGS. 5B–5G are graphs of third channel collection 518a, fourth channel collection 518b, fifth channel collection 518c, sixth channel collection 518d, seventh channel collection 518e, and eighth channel collection 518f as functions of frequency.
Figure 5C:
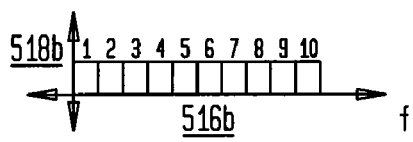
Figure 5D:
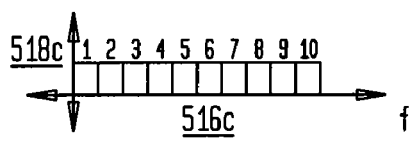
Figure 5E:
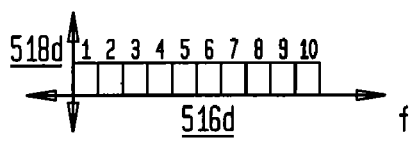
Figure 5F:
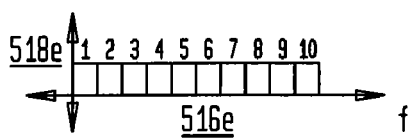
Figure 5G:
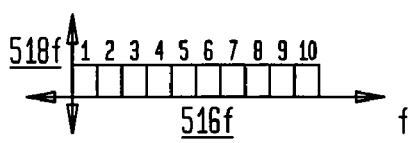
Figure 5A:
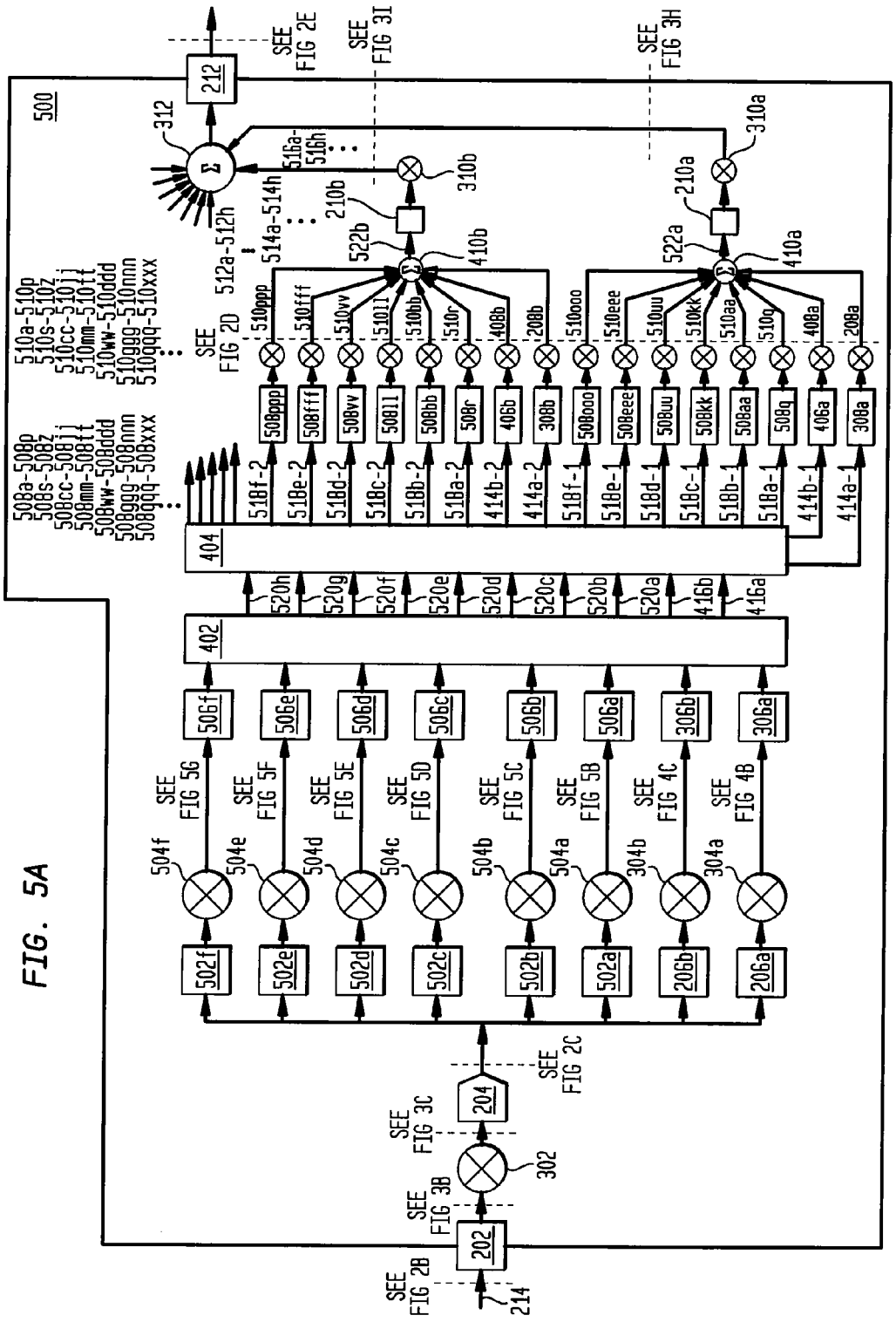
FIG. 5A is a block diagram of an embodiment of an apparatus 500 of the present invention.

FIG. 5A is a block diagram of an embodiment of an apparatus 500 of the present invention. Apparatus 500 comprises input port 202; second mixer 302; first converter 204; eight filters 206a, 206b, and 502a through 502f; eight third mixers 304a, 304b, and 504a through 504f; eight demodulators 306a, 306b, and 506a through 506f; multiplexer 402; demultiplexer 404; eighty encoders 308a, 308b, 406a, 406b, and 508a through 508xxx; eighty first mixers 208a, 208b, 408a, 408b, and 510a through 510xxx; ten second combiners 410a, 410b, and 512a through 512h; ten second converters 210a, 210b, and 514a through 514h; ten fourth mixers 310a, 310b, and 516a through 516h; first combiner 312; and output port 212.

Each of filters 206a, 206b, and 502a through 502f can be configured in an identical manner. Each of third mixers 304a, 304b, and 504a through 504f can be configured in an identical manner. Each of demodulators 306a, 306b, and 506a through 506f can be configured in an identical manner. Each of encoders 308a, 308b, 406a, 406b, and 508a through 508xxx can be configured in an identical manner. Each of first mixers 208a, 208b, 408a, and 408b can be configured in an identical manner. Each of second combiners 410a, 410b, and 512a through 512h can be configured in an identical manner. Each of second converters 210a, 210b, and 514a through 514h can be configured in an identical manner. Each of fourth mixers 310a, 310b, and 516a through 516h can be configured in an identical manner.

Input port 202 is configured to receive signal 214. Signal 214 has first analog format 216. In an embodiment, first analog format 216 complies with the SCTE 40 2003 technical standard. For example, signal 214 can be eighty analog TV channels, wherein each channel is compressed, via quadrature amplitude modulation, to a bandwidth of about 600 kHz. Second mixer 302 is coupled to input port 202. Second mixer 302 is configured to convert signal 214 from being centered at first frequency 314 to being centered at second frequency 316. For example, in accordance with the SCTE 40 2003 technical standard, first frequency 314 can be about 525 MHz. Second frequency 316 can be about 24 MHz to facilitate analog-to-digital conversion. First converter 204 is coupled to second mixer 302. First converter 204 is configured to convert signal 214 to first digital format 218. For example, first digital format 218 can have a bandwidth of about 48 MHz.

Filters 206a, 206b, and 502a through 502f are coupled to first converter 204. The filters are configured to isolate each channel collection of signal 214 from each other channel collection. For example, channel collections 412a, 412b, and 516a through 516f can be isolated by filters 206a, 206b, and 502a through 502f. If the eighty channels are analog TV channels, then in accordance with the EIA-542 standard, first channel collection 412a (FIG. 4B) can include CATV channels 2, 98, 20, 12, 29, 37, 45, 53, 61, and 69; second channel collection 412b (FIG. 4C) can include CATV channels 3, 99, 21, 13, 30, 38, 46, 54, 62, and 70; third channel collection 518a (FIG. 5B) can include CATV channels 4, 14, 22, 23, 31, 39, 47, 55, 63, and 71; fourth channel collection 518b (FIG. 5C) can include CATV channels 5, 15, 7, 24, 32, 40, 48, 56, 64, and 72; fifth channel collection 518c (FIG. 5D) can include CATV channels 6, 16, 8, 25, 33, 41, 49, 57, 65, and 73; sixth channel collection 518d (FIG. 5E) can include CATV channels 95, 17, 9, 26, 34, 42, 50, 58, 66, and 74; seventh channel collection 518e (FIG. 5F) can include CATV channels 96, 18, 10, 27, 35, 43, 51, 59, 67, and 75; and eighth channel collection 518f (FIG. 5G) can include CATV channels 97, 19, 11, 28, 36, 44, 52, 60, 68, and 76.

Third mixers 304a, 304b, and 504a through 504f are coupled to filters 206a, 206b, and 502a through 502f. Each of the third mixers is configured to convert a corresponding channel collection from being centered at a corresponding frequency to being centered at a common frequency. Such conversion can be done, for example, to facilitate digital signal processing. For example, third mixer 304a is configured to convert first channel collection 412a from being centered at about 3 MHz to being centered at about 3 MHz; third mixer 304b is configured to convert second channel collection 412b from being centered at about 9 MHz to being centered at about 3 MHz; etc. Demodulators 306a, 306b, and 506a through 506f are coupled to third mixers 304a, 304b, and 504a through 504f. Each of the demodulators is configured to demodulate a corresponding channel collection. In an embodiment, such demodulation is quadrature amplitude demodulation. The skilled artisan is familiar with implementing quadrature amplitude demodulation.

Multiplexer 402 is coupled to demodulators 306a, 306b, and 506a through 506f. Multiplexer 402 is configured to multiplex first channel 414a-1 of first channel collection 412a, first channel 414b-1 of second channel collection 412b, a first channel 518a-1 of third channel collection 518a, a first channel 518b-1 of fourth channel collection 518b, a first channel 518c-1 of fifth channel collection 518c, a first channel 518d-1 of sixth channel collection 518d, a first channel 518e-1 of seventh channel collection 518e, and a first channel 518f-1 of eighth channel collection 518f to first transport stream 416a; to multiplex second channel 414a-2 of first channel collection 412a, second channel 414b-2 of second channel collection 412b, a second channel 518a-2 of third channel collection 518a, a second channel 518b-2 of fourth channel collection 518b, a second channel 518c-2 of fifth channel collection 518c, a second channel 518d-2 of sixth channel collection 518d, a second channel 518e-2 of seventh channel collection 518e, and a second channel 518f-2 of eighth channel collection 518f to second transport stream 416b; etc. Multiplexer 402 produces ten transport streams 416a, 416b, and 520a through 520h. Each of transport streams 416a, 416b, and 520a through 520h can be configured in a similar manner. In an embodiment, the transport streams comply with a Moving Pictures Expert Group standard.

Demultiplexer 404 is coupled to multiplexer 402. Demultiplexer 404 is configured to demultiplex first transport stream 416a to first channel 414a-1 of first channel collection 412a, first channel 414b-1 of second channel collection 412b, first channel 518a-1 of third channel collection 518a, first channel 518b-1 of fourth channel collection 518b, first channel 518c-1 of fifth channel collection 518c, first channel 518d-1 of sixth channel collection 518d, first channel 518e-1 of seventh channel collection 518e, and first channel 518f-1 of eighth channel collection 518f; to demultiplex second transport stream 416b to second channel 414a-2 of first channel collection 412a, second channel 414b-2 of second channel collection 412b, second channel 518a-2 of third channel collection 518a, second channel 518b-2 of fourth channel collection 518b, second channel 518c-2 of fifth channel collection 518c, second channel 518d-2 of sixth channel collection 518d, second channel 518e-2 of seventh channel collection 518e, and second channel 518f-2 of eighth channel collection 518f; etc.

Encoders 308a, 308b, 406a, 406b, and 508a through 508xxx are coupled to demultiplexer 404. Each of the encoders is configured to encode a corresponding channel. Encoders 308a, 308b, 406a, 406b, and 508a through 508xx encode eighty channels. If the eighty channels are analog TV channels, then an encoder can comprise a video encoder (not shown), an audio encoder (not shown) (e.g., an encoder that complies with a Broadcast Television System Committee stereo encoding standard), and a combiner (not shown) to combine the results of the video encoder and the audio encoder. The skilled artisan is familiar with implementing such an encoding scheme. First mixers 208a, 208b, 408a, 408b, and 510a through 510xxx are coupled to encoders 308a, 308b, 406a, 406b, and 508a through 508xxx. Each of the first mixers is configured to expand a corresponding channel to second digital format 222. For example, each channel in second digital format 222 can have a bandwidth of about 6 MHz.

Second combiner 410a is coupled to first mixers 208a, 408a, 510q, 510aa, 510kk, 510uu, 510eee, and 510ooo. Second combiner 410a is configured to combine the first channels of first channel collection 412a, second channel collection 412b, third channel collection 518a, fourth channel collection 518b, fifth channel collection 518c, sixth channel collection 518d, seventh channel collection 518e, and eighth channel collection 518f to produce a ninth channel collection 522a. For example, ninth channel collection 522a can include CATV channels 2, 3, 4, 5, 6, 95, 96, and 97. Second combiner 410b is coupled to first mixers 208b, 408b, 510r, 510bb, 510ll, 510vv, 510fff and 510ppp. Second combiner 410b is configured to combine the second channels of first channel collection 412a, second channel collection 412b, third channel collection 518a, fourth channel collection 518b, fifth channel collection 518c, sixth channel collection 518d, seventh channel collection 518e, and eighth channel collection 518f to produce a tenth channel collection 522b. For example, tenth channel collection 522b can include CATV channels 8, 99, 14, 15, 16, 17, 18, and 19. Second combiner 512a is coupled to first mixers 510a, 510i, 510s, 510cc, 510mm, 510ww, 510ggg, and 510qqq. Second combiner 512a is configured to combine the third channels of first channel collection 412a, second channel collection 412b, third channel collection 518a, fourth channel collection 518b, fifth channel collection 518c, sixth channel collection 518d, seventh channel collection 518e, and eighth channel collection 518f to produce an eleventh channel collection 522c. For example, eleventh channel collection 522c can include CATV channels 20, 21, 22, 7, 8, 9, 10, and 11. Second combiner 512b is coupled to first mixers 510b, 510j, 510t, 510dd, 510nn, 510xx, 510hhh, and 510rrr. Second combiner 512b is configured to combine the fourth channels of first channel collection 412a, second channel collection 412b, third channel collection 518a, fourth channel collection 518b, fifth channel collection 518c, sixth channel collection 518d, seventh channel collection 518e, and eighth channel collection 518f to produce a twelfth channel collection 522d. For example, twelfth channel collection 522d can include CATV channels 12, 13, 23, 24, 25, 26, 27, and 28. Second combiner 512c is coupled to first mixers 510c, 510k, 510u, 510ee, 510oo, 510yy, 510iii, and 510sss. Second combiner 512c is configured to combine the fifth channels of first channel collection 412a, second channel collection 412b, third channel collection 518a, fourth channel collection 518b, fifth channel collection 518c, sixth channel collection 518d, seventh channel collection 518e, and eighth channel collection 518f to produce a thirteenth channel collection 522e. For example, thirteenth channel collection 522e can include CATV channels 29, 30, 31, 32, 33, 34, 35, and 36.

Second combiner 512d is coupled to first mixers 510d, 510l, 510v, 510ff, 510pp, 510zz, 510jjj, and 510ttt. Second combiner 512d is configured to combine the sixth channels of first channel collection 412a, second channel collection 412b, third channel collection 518a, fourth channel collection 518b, fifth channel collection 518c, sixth channel collection 518d, seventh channel collection 518e, and eighth channel collection 518f to produce a fourteenth channel collection 522f. For example, fourteenth channel collection 522f can include CATV channels 37, 38, 39, 40, 41, 42, 43, and 44. Second combiner 512e is coupled to first mixers 510e, 510m, 510w, 510gg, 510qq, 510aaa, 510kkk, and 510uuu. Second combiner 512e is configured to combine the seventh channels of first channel collection 412a, second channel collection 412b, third channel collection 518a, fourth channel collection 518b, fifth channel collection 518c, sixth channel collection 518d, seventh channel collection 518e, and eighth channel collection 518f to produce a fifteenth channel collection 522g. For example, fifteenth channel collection 522g can include CATV channels 45, 46, 47, 48, 49, 50, 51, and 52. Second combiner 512f is coupled to first mixers 510f, 510n, 510x, 510hh, 510rr, 510bbb, 510lll, and 510vvv. Second combiner 512f is configured to combine the eighth channels of first channel collection 412a, second channel collection 412b, third channel collection 518a, fourth channel collection 518b, fifth channel collection 518c, sixth channel collection 518d, seventh channel collection 518e, and eighth channel collection 518f to produce a sixteenth channel collection 522h. For example, sixteenth channel collection 522h can include CATV channels 53, 54, 55, 56, 57, 58, 59, and 60. Second combiner 512g is coupled to first mixers 510g, 510o, 510y, 510ii, 510ss, 510ccc, 510mmm, and 510www. Second combiner 512g is configured to combine the ninth channels of first channel collection 412a, second channel collection 412b, third channel collection 518a, fourth channel collection 518b, fifth channel collection 518c, sixth channel collection 518d, seventh channel collection 518e, and eighth channel collection 518f to produce a seventeenth channel collection 522i. For example, seventeenth channel collection 522i can include CATV channels 61, 62, 63, 64, 65, 66, 67, and 68. Second combiner 512h is coupled to first mixers 510h, 510p, 510z, 510jj, 510tt, 510ddd, 510nnn, and 510xxx. Second combiner 512h is configured to combine the tenth channels of first channel collection 412a, second channel collection 412b, third channel collection 518a, fourth channel collection 518b, fifth channel collection 518c, sixth channel collection 518d, seventh channel collection 518e, and eighth channel collection 518f to produce an eighteenth channel collection 522j. For example, eighteenth channel collection 522j can include CATV channels 69, 70, 71, 72, 73, 74, 75, and 76.

Second converters 210a, 210b, and 514a through 514h are coupled to second combiners 410a, 410b, and 512a through 512h. Each of the second converters is configured to convert a corresponding channel collection to second analog format 224. Fourth mixers 310a, 310b, and 516a through 516h are coupled to second converters 210a, 210b, and 514a through 514h. Each fourth mixer is configured to convert a corresponding channel collection from being centered at a common frequency to being centered at a corresponding frequency. For example, fourth mixer 310a is configured to convert ninth channel collection 522a from being centered at about 30 MHz to being centered at about 84 MHz; fourth mixer 310b is configured to convert tenth channel collection 522*b* from being centered at about 30 MHz to being centered at about 144 MHz; etc. For example, if signal 214 is eighty analog TV channels, the fourth mixers can cause an analog channel to be centered at a frequency such that the analog channel is within the band of frequencies to which it has been assigned by the FCC.

Advantageously, apparatus 500 does not need to have an independent tuner. If the tuner of a TV receiver is configured for CATV channels, an analog channel can be selected from this tuner. If the tuner of a TV receiver is configured for broadcast TV channels and some broadcast TV channels are transmitted on a different CATV channel (e.g., broadcast TV channel 19 (500 MHz) is transmitted on CATV channel 19 (150 MHz) or broadcast TV channel 82 (878 MHz) is transmitted on CATV channel 99 (114 MHz)), then apparatus 500 can further comprise a tuner translator (not shown) coupled to output port 212 and configured to identify the broadcast TV channel to which the TV receiver is tuned and to pass the corresponding CATV channel from output port 212 to the TV receiver.

First combiner 312 is coupled to fourth mixers 310*a*, 310*b*, and 516*a* through 516*h*. First combiner is configured to combine ninth channel collection 522*a*, tenth channel collection 522*b*, eleventh channel collection 522*c*, twelfth channel collection 522*d*, thirteenth channel collection 522*e*, fourteenth channel collection 522*f*, fifteenth channel collection 522*g*, sixteenth channel collection 522*h*, seventeenth channel collection 522*i*, and eighteenth channel collection 522*j*. Output port 212 is coupled to first combiner 312. Output port 212 is configured to produce signal 214. From the descriptions above of apparatuses 200, 300, and 400, the skilled artisan recognizes alternative embodiments for apparatus 500. Accordingly, the present invention is not limited to the configuration of apparatus 500 as depicted at FIG. 5A.

Figure 6A:
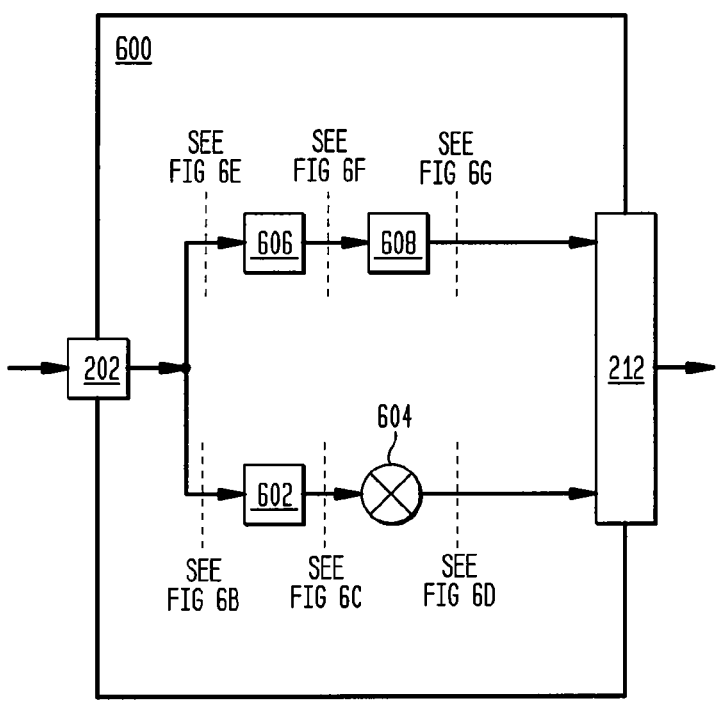
FIG. 6A is a block diagram of an embodiment of an apparatus 600 of the present invention.

FIG. 6A is a block diagram of an embodiment of an apparatus 600 of the present invention. Apparatus 600 comprises input port 202, a first filter 602, a mixer 604, a second filter 606, a decompressor 608, and output port 212. Input port 202 is configured to receive a digital signal 610 and analog signal 214. First filter 602 is coupled to input port 202 and configured to pass digital signal 610 (FIG. 6B). Digital signal 610 is centered at a first frequency 612 (FIG. 6C). In an embodiment, digital signal 610 is configured to comply with the SCTE 40 2003 technical standard when received at input port 202. For example, digital signal 610 can be for the Next Generation Digital services, which have been allocated by the SCTE 40 2003 technical standard to be transmitted in the band of frequencies between about 108 MHz and about 500 MHz, and centered at a frequency of about 304 MHz. Mixer 604 is coupled to first filter 602 and configured to convert digital signal 610 from being centered at first frequency 612 to being centered at a second frequency 614 (FIG. 6D). For example, the second frequency can be about 946 MHz.

Figure 6H:
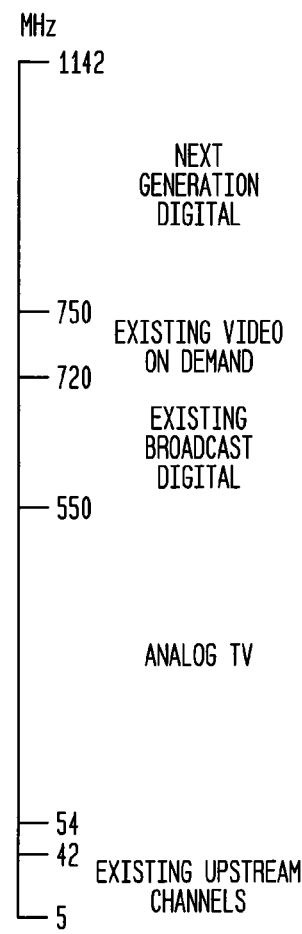
FIG. 6H shows the allocation of services to frequencies for a TV receiver configured to receive both analog formatted TV signals and digital formatted TV signals.
Figure 6B:
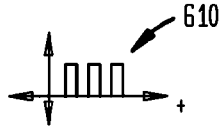
FIGS. 6B and 6E are graphs of digital signal 610 and analog signal 214.
Figure 6C:
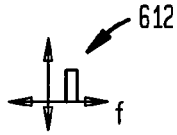
FIGS. 6C and 6D are graphs of digital signal 610 as a function of frequency.
Figure 6F:
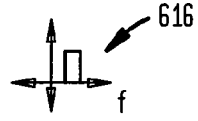
FIGS. 6F and 6G are graphs of analog signal 214 as a function of frequency.
Figure 6D:
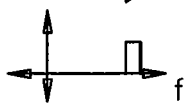
Figure 6E:
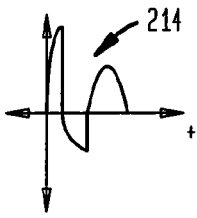
Figure 6G:
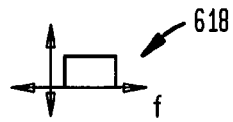

Second filter 606 is coupled to input port 202 and configured to pass analog signal 214 (FIG. 6E). Analog signal 214 is centered at a third frequency 616 (FIG. 6F). In an embodiment, analog signal 214 is configured to comply with the SCTE 40 2003 technical standard when received at input port 202. For example, analog signal 214 can be for eighty analog TV channels, which have been allocated by the SCTE 40 2003 technical standard to be transmitted in the band of frequencies between about 500 MHz and about 550 MHz, and centered at a frequency of about 525 MHz. Decompressor 608 is coupled to second filter 606 and configured to decompress analog signal 214. Decompressed analog signal 214 is centered at a fourth frequency 618 (FIG. 6G). For example, decompressed analog signal 214 can span a band of frequencies between about 54 MHz and about 550 MHz and centered at a frequency of about 302 MHz. Output port 212 is coupled to mixer 604 and decompressor 608 and configured to produce digital signal 610 and analog signal 214.

From the descriptions above of apparatuses 200, 300, 400, and 500, the skilled artisan recognizes alternative embodiments for apparatus 600. Accordingly, the present invention is not limited to the configuration of apparatus 600 as depicted at FIG. 6A.

Advantageously, apparatus 600 increases the amount of data that can be transmitted within the frequency range of a typical CATV system. Both the eighty analog TV channels and the Next Generation Digital services can be transmitted at frequencies within about 550 MHz.

Advantageously, with apparatus 600, a TV receiver configured to receive both analog formatted TV signals and digital formatted TV signals can receive the Next Generation Digital services, the eighty analog TV channels, or any combination of the foregoing (FIG. 6H). Furthermore, the eighty analog TV channels can be received from a broadcast TV system, a CATV system, or a DTH TV system.

Figure 7A:
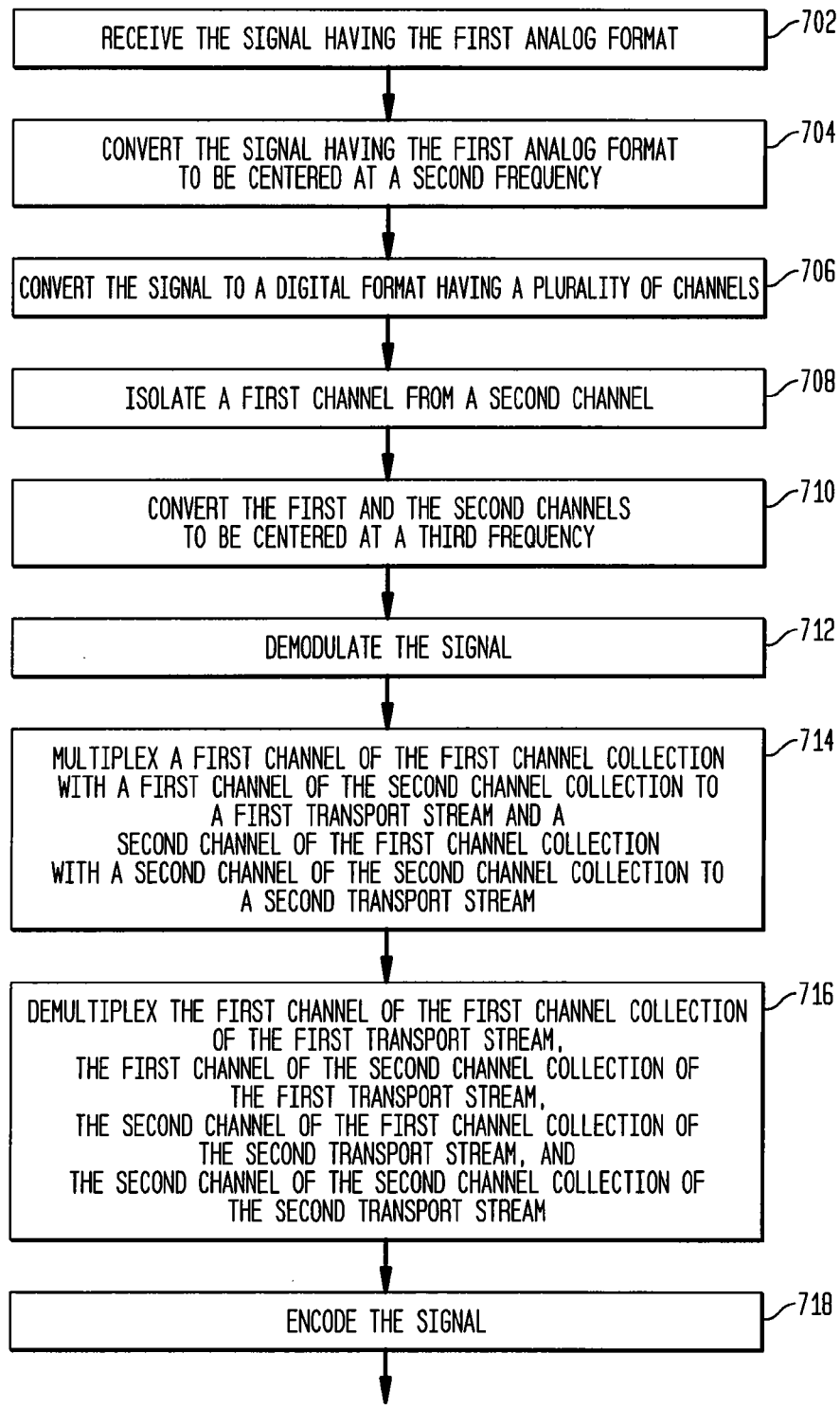

FIGS. 7A and 7B show a flow chart of a method 700 for converting a signal from a first analog format to a second analog format in the manner of the present invention. Described below is an embodiment of method 700 that includes several optional steps. However, the skilled artisan recognizes alternative embodiments that incorporate some, but not all, of these several optional steps. Accordingly, method 700 is not limited to the configuration that includes each of these several optional steps as depicted at FIG. 7.

In method 700, at a step 702, the signal is received. The signal has the first analog format. The signal is centered at a first frequency. The signal having the first analog format can be a digital representation of the signal such that the digital representation is realized with a continuously varying waveform. The continuously varying waveform can be quadrature amplitude modulated. The first analog format can be a compressed format and the second analog format can be a decompressed format. In an embodiment, the first analog format complies with the SCTE 40 2003 technical standard. In an embodiment, the second analog format is a conventional analog format.

Optionally, at a step 704, the signal is converted to be centered at a second frequency. For example, the first frequency can be a radio frequency and the second frequency can be a baseband frequency. At a step 706, the signal is converted to a digital format. The signal has a plurality of channels. Each channel of the plurality of channels is centered at a corresponding frequency. Optionally, at a step 708, a first channel of the plurality of channels is isolated from a second channel of the plurality of channels. The first channel is centered at a first corresponding frequency. The second channel is centered at a second corresponding frequency. Optionally, at a step 710, the first channel is converted to be centered at a third frequency and the second channel is converted to be centered at the third frequency. Optionally, at a step 712, the signal is demodulated. The first channel can be demodulated and the second channel can be demodulated. In an embodiment, the signal is quadrature amplitude demodulated.

If the first channel is a first channel collection and the second channel is a second channel collection, then optionally: (1) at a step 714, a first channel of the first channel collection is multiplexed with a first channel of the second channel collection to a first transport stream and a second channel of the first channel collection is multiplexed with a second channel of the second channel collection to a second transport stream; and (2) at a step 716, the first channel of the first channel collection of the first transport stream is demultiplexed, the first channel of the second channel collection of the first transport stream is demultiplexed, the second channel of the first channel collection of the second transport stream is demultiplexed, and the second channel of the second channel collection of the second transport stream is demultiplexed.

Optionally, at a step 718, the signal is encoded. The first channel can be encoded and the second channel can be encoded. For example, a video portion of each channel can be encoded, an audio portion of each channel can be encoded, and the results can be combined. At a step 720, the signal is expanded. The first channel can be expanded and the second channel can be expanded.

If the first channel is a first channel collection and the second channel is a second channel collection, then optionally, at a step 722, the first channel of the first channel collection of the first transport stream is combined with the first channel of the second channel collection of the first transport stream and the second channel of the first channel collection of the second transport stream is combined with the second channel of the second channel collection of the second transport stream.

At a step 724, the signal is converted to the second analog format. The first channel can be converted to a first analog channel and the second channel can be converted to a second analog channel. The first analog channel has the second analog format and the second analog channel has the second analog format. Optionally, at a step 726, the signal can be converted to be centered at a fourth frequency. The first analog channel can be converted to be centered at a fifth frequency and the second analog channel can be converted to be centered at a sixth frequency. Optionally, at a step 728, the first analog channel is combined with the second analog channel.

Figure 8:
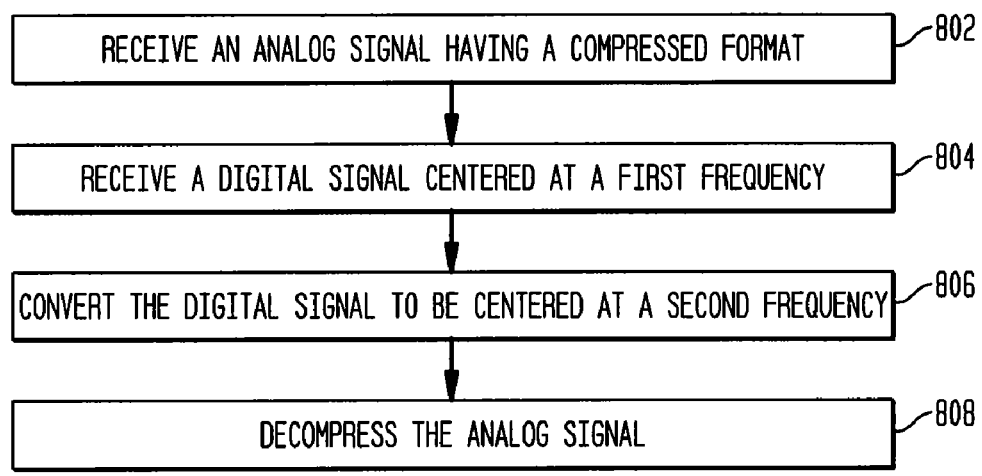
FIG. 8 shows a flow chart of a method 800 for converting signals in the manner of the present invention.

FIG. 8 shows a flow chart of a method 800 for converting signals in the manner of the present invention. In method 800, at a step 802, an analog signal of the signals is received. The analog signal has a compressed format. The analog signal having the compressed format can be a digital representation of the signal such that the digital representation is realized with a continuously varying waveform. The continuously varying waveform can be quadrature amplitude modulated. In an embodiment, the analog signal is configured to comply with the SCTE 40 2003 technical standard. For example, the analog signal can be for eighty analog TV channels, which have been allocated by the SCTE 40 2003 technical standard to be transmitted in the band of frequencies between about 500 MHz and about 550 MHz, and centered at a frequency of about 525 MHz.

At a step 804, a digital signal of the signals is received. The digital signal is centered at a first frequency. In an embodiment, the digital signal is configured to comply with the SCTE 40 2003 technical standard. For example, the digital signal can be for the Next Generation Digital services, which have been allocated by the SCTE 40 2003 technical standard to be transmitted in the band of frequencies between about 108 MHz and about 500 MHz, and centered at a frequency of about 304 MHz.

At a step 806, the digital signal is converted to be centered at a second frequency. For example, the second frequency can be about 946 MHz. At a step 808, the analog signal is decompressed. For example, the decompressed analog signal can span a band of frequencies between about 54 MHz and about 550 MHz and centered at a frequency of about 302 MHz.

From the description above of method 700, the skilled artisan recognizes alternative embodiments for method 800. Accordingly, the present invention is not limited to the steps of method 800 as depicted at FIG. 8.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. An apparatus for converting a signal from a first analog format to a second analog format, comprising:
   an input port configured to receive the signal, the signal having the first analog format;
   a first converter coupled to said input port and configured to convert the signal to a first digital format;
   filters coupled to said first converter and configured to isolate a first channel of the signal from a second channel of the signal, wherein said first channel is centered at a first frequency, said second channel is centered at a second frequency, and said first frequency is different from said second frequency;
   first mixers coupled to said filters and configured to expand a bandwidth of said first channel and a bandwidth of said second channel to a second digital format;
   second converters coupled to said first mixers and configured to convert said first channel and said second channel to the second analog format; and
   an output port coupled to said second converters and configured to produce the signal having the second analog format.

2. The apparatus of claim 1, wherein the first analog format complies with a SCTE 40 2003 technical standard.

3. The apparatus of claim 1, wherein the second analog format is a conventional analog format.

4. The apparatus of claim 1, further comprising:
   a second mixer coupled to said input port and configured to convert the signal from being centered at a third frequency to being centered at a fourth frequency.

5. The apparatus of claim 4, wherein the first analog format complies with a SCTE 40 2003 technical standard.

6. The apparatus of claim 1, further comprising:
   second mixers coupled to said filters and configured to convert said first channel from being centered at said first frequency to being centered at a third frequency and said second channel from being centered at said second frequency to being centered at said third frequency.

7. The apparatus of claim 6, wherein the first analog format complies with a SCTE 40 2003 technical standard.

8. The apparatus of claim 1, further comprising:
   demodulators coupled to said filters and configured to demodulate said first channel and said second channel.

9. The apparatus of claim 8, wherein the first analog format complies with a SCTE 40 2003 technical standard.

10. The apparatus of claim 1, further comprising:
encoders coupled to said first mixers and configured to encode said first channel and said second channel.

11. The apparatus of claim 10, wherein the first analog format complies with a SCTE 40 2003 technical standard.

12. The apparatus of claim 1, further comprising:
second mixers coupled to said second converters and configured to convert said first channel from being centered at said first frequency to being centered at a third frequency and said second channel from being centered at said second frequency to being centered at a fourth frequency.

13. The apparatus of claim 12, wherein the first analog format complies with a SCTE 40 2003 technical standard.

14. The apparatus of claim 12, further comprising:
a combiner coupled to said second mixers and configured to combine said first channel with said second channel.

15. The apparatus of claim 14, wherein the first analog format complies with a SCTE 40 2003 technical standard.

16. An apparatus for converting a signal from a first analog format to a second analog format, comprising:
an input port configured to receive the signal, the signal having the first analog format;
a first converter coupled to said input port and configured to convert the signal to a first digital format;
filters coupled to said first converter and configured to isolate a first channel collection of the signal from a second channel collection of the signal;
a multiplexer coupled to said filters and configured to multiplex a first channel of said first channel collection with a first channel of said second channel collection to a first transport stream and to multiplex a second channel of said first channel collection with a second channel of said second channel collection to a second transport stream;
a demultiplexer coupled to said multiplexer and configured to demultiplex said first transport stream to said first channel of said first channel collection and said first channel of said second channel collection and to demultiplex said second transport stream to said second channel of said first channel collection and said second channel of said second channel collection;
a first combiner coupled to said demultiplexer and configured to combine said first channel of said first channel collection with said first channel of said second channel collection;
a second combiner coupled to said demultiplexer and configured to combine said second channel of said first channel collection with said second channel of said second channel collection;
first mixers coupled to said filters and configured to expand said first channel collection and said second channel collection to a second digital format;
second converters coupled to said first mixers and configured to convert said first channel collection and said second channel collection to the second analog format; and
an output port coupled to said second converters and configured to produce the signal having the second analog format.

17. The apparatus of claim 16, wherein the first analog format complies with a SCTE 40 2003 technical standard.

18. A method for converting a signal from a first analog format to a second analog format, comprising the steps of:
(1) receiving the signal, the signal having the first analog format;
(2) converting the signal to a digital format;
(3) expanding a bandwidth of a first channel of the signal and a bandwidth of a second channel of the signal, wherein the first channel is centered at a first frequency, the second channel is centered at a second frequency, and the first frequency is different from the second frequency; and
(4) converting the signal to the second analog format.

19. The method of claim 18, wherein the first analog format is a compressed format and the second analog format is a decompressed format.

20. The method of claim 18, wherein the first analog format is quadrature amplitude modulated.

21. The method of claim 20, wherein the first analog format complies with a SCTE 40 2003 technical standard.

22. The method of claim 18, wherein the second analog format is a conventional analog format.

23. The method of claim 18, wherein the signal having the first analog format is centered at a third frequency, and further comprising the step of:
(5) converting the signal having the first analog format to be centered at a fourth frequency.

24. The method of claim 23, wherein the first analog format complies with a SCTE 40 2003 technical standard.

25. The method of claim 18, wherein the signal having the second analog format is centered at a third frequency, and further comprising the step of:
(5) converting the signal having the second analog format to be centered at a fourth frequency.

26. The method of claim 25, wherein the first analog format complies with a SCTE 40 2003 technical standard.

27. The method of claim 18, further comprising the step of:
(5) demodulating the signal.

28. The method of claim 27, wherein the first analog format complies with a SCTE 40 2003 technical standard.

29. The method of claim 18, further comprising the step of:
(5) encoding the signal.

30. The method of claim 29, wherein the first analog format complies with a SCTE 40 2003 technical standard.

31. The method of claim 18, further comprising the step of:
(5) isolating the first channel from the second channel.

32. The method of claim 31, wherein said step (3) comprises the step of:
converting the first channel to a first analog channel and the second channel to a second analog channel, the first analog channel having the second analog format and the second analog channel having the second analog format.

33. The method of claim 31, further comprising the step of:
(6) converting the first channel to be centered at a third frequency and the second channel to be centered at the third frequency.

34. The method of claim 33, wherein the signal having the first analog format complies with a SCTE 40 2003 technical standard.

35. The method of claim 32, further comprising the step of:
(6) converting the first analog channel to be centered at a third frequency and the second analog channel to be centered at a fourth frequency.

36. The method of claim 35, wherein the signal having the first analog format complies with a SCTE 40 2003 technical standard.

37. The method of claim 32, further comprising the step of:
(6) combining the first analog channel with the second analog channel.

38. The method of claim 37, wherein the first analog format complies with a SCTE 40 2003 technical standard.

39. A method for converting a signal from a first analog format to a second analog format, comprising the steps of:
(1) receiving the signal, the signal having the first analog format;
(2) converting the signal to a digital format, the signal having a plurality of channel collections, wherein each channel of the plurality of channel channels is centered at a corresponding frequency;
(3) expanding the signal;
(4) converting the signal to the second analog format;
(5) isolating a first channel collection of the plurality of channel collections from a second channel collection of the plurality of channel collections, the first channel collection centered at a first corresponding frequency and the second channel collection centered at a second corresponding frequency;
(6) multiplexing a first channel of the first channel collection with a first channel of the second channel collection to a first transport stream and a second channel of the first channel collection with a second channel of the second channel collection to a second transport stream;
(7) demultiplexing the first channel of the first channel collection of the first transport stream, the first channel of the second channel collection of the first transport stream, the second channel of the first channel collection of the second transport stream, and the second channel of the second channel collection of the second transport stream; and
(8) combining the first channel of the first channel collection of the first transport stream with the first channel of the second channel collection of the first transport stream and the second channel of the first channel collection of the second transport stream with the second channel of the second channel collection of the second transport stream.

40. The method of claim 39, wherein the first analog format complies with a SCTE 40 2003 technical standard.

41. A method for converting signals, comprising the steps of:
(1) receiving, at an input port, an analog signal of the signals, the analog signal having a compressed format defined by a first bandwidth;
(2) receiving, at the input port, a digital signal of the signals, the digital signal centered at a first frequency;
(3) converting the digital signal to be centered at a second frequency; and
(4) decompressing the analog signal to have a second bandwidth, wherein the second bandwidth is greater than the first bandwidth.

42. The method of claim 41, wherein the analog signal having the compressed format is quadrature amplitude modulated.

43. The method of claim 42, wherein the analog signal having the compressed format and the digital signal centered at the first frequency comply with a SCTE 40 2003 technical standard.

44. The method of claim 41, wherein said decompressing the analog signal comprises decompressing the analog signal received at the input port having the compressed format.

* * * * *